(12) United States Patent
Dodson et al.

(10) Patent No.: US 11,755,917 B2
(45) Date of Patent: Sep. 12, 2023

(54) GENERATING DEPTH FROM CAMERA IMAGES AND KNOWN DEPTH DATA USING NEURAL NETWORKS

(71) Applicant: Waymo LLC, Mountain View, CA (US)

(72) Inventors: Bradley Dodson, Seattle, WA (US); Zhinan Xu, San Jose, CA (US)

(73) Assignee: Waymo LLC, Mountain View, CA (US)

(*) Notice: Subject to any disclaimer, the term of this patent is extended or adjusted under 35 U.S.C. 154(b) by 878 days.

(21) Appl. No.: 16/734,057

(22) Filed: Jan. 3, 2020

(65) Prior Publication Data

US 2021/0149408 A1 May 20, 2021

Related U.S. Application Data

(60) Provisional application No. 62/922,228, filed on Nov. 15, 2019.

(51) Int. Cl.
*G06N 3/084* (2023.01)
*G05D 1/02* (2020.01)
(Continued)

(52) U.S. Cl.
CPC ............ *G06N 3/084* (2013.01); *G05D 1/0219* (2013.01); *G05D 1/0221* (2013.01); *G06N 3/08* (2013.01);
(Continued)

(58) Field of Classification Search
CPC .......... G06N 3/084; G06N 3/08; G06N 3/045; G05D 1/0219; G05D 1/0221;
(Continued)

(56) References Cited

U.S. PATENT DOCUMENTS

| 6,903,735 B2 | 6/2005 | Jeong et al. |
| 11,563,929 B2* | 1/2023 | Saphier ............... G01B 11/25 |

(Continued)

FOREIGN PATENT DOCUMENTS

| WO | WO 2018/104563 | 6/2018 |
| WO | WO 2019/092439 | 5/2019 |

OTHER PUBLICATIONS

International Preliminary Report on Patentability in International Appln. No. PCT/US2020/060229, dated May 27, 2022, 7 pages.
(Continued)

*Primary Examiner* — Thomas Ingram
(74) *Attorney, Agent, or Firm* — Fish & Richardson P.C.

(57) ABSTRACT

Methods, systems, and apparatus, including computer programs encoded on computer storage media, for generating a depth map of a scene from a camera image using a neural network. One of the methods includes obtaining an image captured by a first sensor. A neural network processes the image to generate a respective score for each of a plurality of locations in the image. Known depth data specifying respective known depth values for some of the locations in the image is obtained. A depth output is generated that assigns a depth value to some of the locations in the image, including determining whether the score for a location exceeds a threshold; and when the score exceeds the threshold and the known depth value is available for the location, assigning the known depth value for the location to the location in the depth output.

24 Claims, 4 Drawing Sheets

(51) Int. Cl.
*G06N 3/08* (2023.01)
*G06V 20/56* (2022.01)
*G06V 10/764* (2022.01)
*G06V 10/82* (2022.01)
*G06V 20/58* (2022.01)

(52) U.S. Cl.
CPC ............ *G06V 10/764* (2022.01); *G06V 10/82* (2022.01); *G06V 20/56* (2022.01); *G06V 20/58* (2022.01); *G05D 2201/0213* (2013.01)

(58) Field of Classification Search
CPC ........... G05D 2201/023; G06V 10/764; G06V 10/82; G06V 20/56; G06V 20/58; G06V 10/751; G06F 18/24133; G06F 18/2415
See application file for complete search history.

(56) References Cited

U.S. PATENT DOCUMENTS

| | | | |
|---|---|---|---|
| 2017/0052032 A1 | 2/2017 | Miksa et al. | |
| 2017/0193672 A1* | 7/2017 | Bhardwaj | G06F 16/5862 |
| 2021/0149408 A1* | 5/2021 | Dodson | G06N 3/08 |
| 2022/0292837 A1* | 9/2022 | Guizilini | G06T 7/70 |

OTHER PUBLICATIONS

Maier et al., "Real-time navigation in 3D environments based on depth camera data," IEEE-RAS International Conference on Humanoid Robots, Nov. 2012, pp. 692-697.

PCT International Search Report and Written Opinion in International Appln. No. PCT/US2020/060229, dated Mar. 5, 2021, 11 pages.

Battiato et al., "Depth-Map Generation by Image Classification," Three-Dimensional Image Capture and Applications VI, Apr. 2004, vol. 5302:95-104.

Song et al., "Deep Depth Super-Resolution: Learning Depth Super-Resolution Using Deep Convolutional Neural Network," https://arxiv.org/abs/1607.01977, Jul. 2016, 13 pages.

Wang et al., "MVDepthNet: Real-Time Multiview Depth Estimation Neural Network," 2018 International Conference on 3D Vision (3DV), Sep. 2018, 248-257.

Wong, "A New Method for Creating a Depth Map for Camera Auto Focus Using an All in Focus Picture and 2D Scale Space Matching," 2006 IEEE International Conference on Acoustics Speech and Signal Processing Proceedings, May 2006, 3:1184-1187.

* cited by examiner

GENERATING DEPTH FROM CAMERA IMAGES AND KNOWN DEPTH DATA USING NEURAL NETWORKS

CROSS-REFERENCE TO RELATED APPLICATIONS

This application claims priority to U.S. application Ser. No. 62/922,228, filed on Nov. 15, 2019.

BACKGROUND

This specification relates to autonomous vehicles.

Autonomous vehicles include self-driving cars, boats, and aircraft. Autonomous vehicles use a variety of on-board sensors and computer systems to generate a depth map of a scene and use such depth map to make control and navigation decisions.

Conventionally, a depth map can be generated based on laser and radar data because the laser and radar sensors of the vehicle can report the range of objects they are sensing. The lasers and radars can report the range of objects they are sensing, and can determine how much space is free in front of those objects. However, the range that the lasers and radars can sense is usually not far enough to report depth map of objects that are hundreds of meters away.

Some autonomous vehicles have computer systems that implement neural networks for object detection and segmentation within images. For example, a neural network can be used to determine locations in an image captured by an on-board camera is likely to be an image of a nearby car.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameters can be used to make predictions in a production system.

Convolutional neural networks include convolutional neural network layers. Convolutional neural network layers have a neuron connectivity that takes advantage of spatially local correlation in the input data. To do so, convolutional neural network layers have sparse connectivity, with neurons in one convolutional layer receiving input from only a small subset of neurons in the previous neural network layer. The other neurons from which a neuron receives its input defines a receptive field for that neuron.

Convolutional neural network layers have one or more parameters that define one or more filters for each layer, with each filter having one or more parameters. A convolutional neural network layer generates an output by performing a convolution of each neuron's filter with the layer's input.

In addition, each convolutional network layer can have neurons in a three-dimensional arrangement, with depth, width, and height dimensions. The width and height dimensions correspond to the two-dimensional features of the layer's input. The depth-dimension includes one or more depth sublayers of neurons. Convolutional neural networks employ weight sharing so that all neurons in a depth sublayer have the same weights. This provides for translation invariance when detecting features in the input.

Convolutional neural networks can also include fully-connected layers and other kinds of layers. Neurons in fully-connected layers receive input from each neuron in the previous neural network layer.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes how a computer system can implement a fully-learned neural network to generate a depth map of a scene from a camera image and known depth data using a neural network.

In general, one innovative aspect of the subject matter described in this specification can be embodied in methods that include the actions of obtaining an image captured by a first sensor and characterizing a scene in an environment; processing the image using a neural network to generate a respective score for each of a plurality of locations in the image, wherein the respective score for each location represents a likelihood that a static portion of the environment is visible at the location in the image; obtaining known depth data specifying respective known depth values for at least some of the locations in the image, wherein the respective known depth value for each location is a distance from the first sensor to the static portion of the environment when the static portion is visible at the location in the image; and generating a depth output that assigns a respective depth value to at least some of the locations in the image, including, for each location in the image: determining whether the score for the location exceeds a threshold; and when the score for the location exceeds the threshold and the known depth data specifies a known depth value for the location, assigning the known depth value for the location to the location in the depth output. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Static portion is a ground surface of the environment. The actions include obtaining location information identifying a region of the image that depicts a non-static object in the image; and wherein generating the depth output further includes: determining whether any locations having a score that exceeds a threshold are next to or intersect with the region in the image; and when one of the locations is next to or intersects with the region, assigning the depth value in the depth output for the locations corresponding to the region using the generated depth value for the location. The static portion is a ground surface of the environment, and wherein the non-static object is a car in the image. The locations are pixels of the image, and wherein the neural network is an image segmentation neural network configured to generate a respective score for each pixel in the image. The known depth data assigns a respective known depth value to each of a plurality of pixels in a second image that is from a same perspective as the image captured by the first sensor. Generating the depth output further includes: associating the known depth value with the score for the location in the depth output. The actions include determining that there is an occlusion at a first location for which the known depth data specifies a known depth value based at least in part on the respective score for the first location.

Particular embodiments of the subject matter described in this specification can be implemented so as to realize one or more of the following advantages. An autonomous or semi-autonomous vehicle system can use a fully-learned neural network and known depth data to generate a depth map of a scene from a camera image that characterizes the scene. This can allow the vehicle to reason about how much space is free in front of those objects and where there might be occluded obstacles. Because cameras can sense significantly farther and at higher angular resolution than lasers or radars, the depth map generated from a camera image can allow depth values to be available for locations that cannot be sensed by lasers or radars. The depth map generated from the camera image can be used to cross validate the depth information generated from other sensors, such as lasers or radars, and remove noise in the depth map. The depth map generated from the camera image can also be used to localize object detections in a three-dimensional scene, and provide an alternative depth source for objects that are on the ground. The depth map generated from the camera can also establish the field of view for the camera by providing information about where the camera can see and where the camera cannot see. Additionally, some vehicles may not be equipped with laser or radar sensors and instead may only have a camera system. More generally, the system can exploit the depth map at many stages of an autonomous or semi-autonomous vehicle pipeline, e.g., segmentation, tracking, action recognition and behavior prediction. In other words, by being able to accurately identify a depth map of a surrounding environment, the vehicle can make better autonomous driving decisions or can provide better semi-autonomous driving recommendations for the operator of the vehicle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a fully-learned neural network and known depth data to generate a depth map of a scene from an image that characterizes the scene.

The depth map specifies a respective depth value for at least some of the locations in the image. The depth map can represent the range of objects the camera is sensing, i.e., the distance from the camera to the objects, and can allow the vehicle to reason about how much space is free in front of those objects and where there might be occluded obstacles.

Conventionally, a depth map can be generated based on laser and radar data because the laser and radar sensors of the vehicle can report the range of objects they are sensing. However, cameras can sense significantly farther and at higher angular resolution than lasers or radars. Therefore, it is beneficial to generate depth maps from camera images as described in this specification.

A neural network can be trained to identify locations in the image that are static portions of an environment. Static portions of the image can be a ground surface of the environment, including road, paved sidewalks and driveways, and grass areas, to name just a few examples.

Often, depth data specifying a known depth value for some locations in the image can be available. For example, a depth map for a road without cars may be available. Based on the known depth data specifying respective known depth values for some static locations in the image, the vehicle can calculate the range of those static locations in the camera image.

As used in this description, a "fully-learned" machine learning model is a model that is trained to compute a desired prediction. In other words, a fully-learned model generates an output based solely on training data rather than on human-programmed decision logic.

Figure 1:
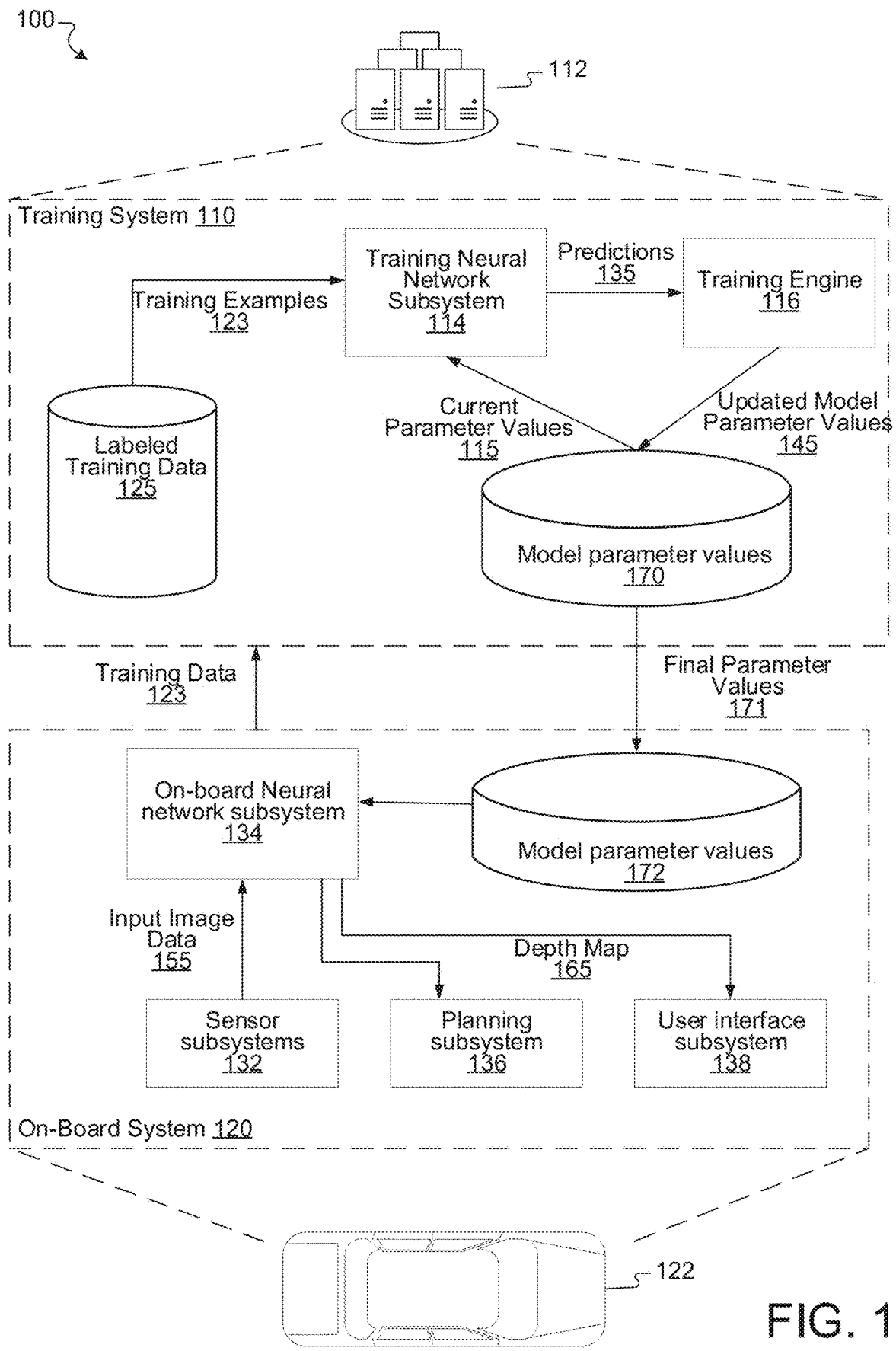
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type. The vehicle 122 can be a fully autonomous vehicle that uses depth maps to inform fully-autonomous driving decisions. The vehicle 122 can also be a semi-autonomous vehicle that uses depth maps to aid a human driver. For example, the vehicle 122 can autonomously apply the brakes if a depth map indicates that a human driver is about to navigate onto static obstacles, e.g., a paved sidewalk or other non-road ground surface. As another example, for automatic lane changing, the vehicle 122 can use a depth map to analyze available space surroundings of a target lane to ensure that there is no fast approaching traffic before starting a lane changing operation. As another example, the vehicle 122 can use the depth map to filer radar signals from static objects. The vehicle 122 can also use the depth map to identify situations when the road is not visible and thus trigger alerts to the driver.

The on-board system 120 includes one or more sensor subsystems 132. The sensor subsystems include a combination of components that receive reflections of electromagnetic radiation, e.g., laser systems that detect reflections of laser light, radar systems that detect reflections of radio waves, and camera systems that detect reflections of visible light.

The sensor subsystems 132 provide input image data 155 to an on-board neural network subsystem 134. The input image data 155 can include an image of the scene captured by the camera systems. Thus, the input image data 155 characterizes a scene in the vicinity of the autonomous vehicle.

The on-board neural network subsystem 134 implements the operations of each layer of a neural network trained to predict locations in the input image data 155 that are static, e.g., a ground surface of the environment. Thus, the on-board neural network subsystem 134 includes one or more computing devices having software or hardware modules that implement the respective operations of each layer of the neural network according to an architecture of the neural network.

The on-board neural network subsystem 134 can implement the operations of each layer of the neural network by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

The on-board neural network subsystem 134 can use hardware acceleration or other special-purpose computing devices to implement the operations of one or more layers of the neural network. For example, some operations of some layers may be performed by highly parallelized hardware, e.g., by a graphics processing unit or another kind of specialized computing device. In other words, not all operations of each layer need to be performed by central processing units (CPUs) of the on-board neural network subsystem 134.

The on-board neural network subsystem 134 uses a plurality of static locations predicted by a neural network to generate a depth map 165 based on known depth data.

In some implementations, the known depth data can be a road-based range map, in which the depth of the road areas is known. By filtering the road-based range map to only include the areas actually observed as road in the camera image, the on-board neural network system 134 can obtain a depth map for some part of the image that has road.

The on-board neural network subsystem 134 can provide the depth map 165 to a planning subsystem 136, a user interface subsystem 138, or both. The planning subsystem 136 can combine the depth map 165 generated from camera images with other depth maps generated from laser data or radar data, or from a combination of both. For example, in addition to the depth map generated by the lasers and radars, the depth map 165 may provide visibility for hundreds of meters in some directions that are not blocked by an obstacle.

In some implementations, the on-board neural network subsystem 134 can predict the depth value output of a non-static object from the depth map 165 generated from camera images. For example based on the depth value 165 of the road areas generated from camera images, the on-board neural network subsystem 134 can assign, to a car in the environment, the depth value for a portion of the road that is next to the car. Even though the car is outside the range measurable from lasers and radars, the depth value of the car can still be estimated based on the camera image.

When a planning subsystem 136 receives the depth map 165, the planning subsystem 136 can use the depth map 165 to make fully-autonomous or semi-autonomous driving decisions. For example, the planning subsystem 136 can generate a fully-autonomous plan to navigate on a highway or other road by querying the depth map 165 to identify distances to static surfaces in the vicinity of the car and to identify areas where there are occlusions, i.e., areas where depth information is not present in the depth map 165. By identifying occlusions through the depth map, during a turn operation, the vehicle can perform a necessary yield operation to a potential object which cannot be seen because the object is occluded by a building, a car, or a tree, etc. As another example, the planning subsystem 136 can generate a semi-autonomous plan for a human driver to navigate the car using the depth map 165.

A user interface subsystem 138 can receive the depth map 165 and can generate a user interface presentation that indicates the depth map of nearby objects, e.g., a road or a nearby vehicle. For example, the user interface subsystem 138 can generate a user interface presentation having image or video data containing a representation of the regions of space that have depth value below a certain threshold. An on-board display device can then display the user interface presentation for passengers of the vehicle 122.

The on-board neural network subsystem 134 can also use the input image data 155 to generate training data 123. The on-board system 120 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a training neural network subsystem 114 that can implement the operations of each layer of a neural network that is designed to make object interaction predictions from input image data. The training neural network subsystem 114 includes a plurality of computing devices having software or hardware modules that implement the respective operations of each layer of the neural network according to an architecture of the neural network.

The training neural network generally has the same architecture and parameters as the on-board neural network. However, the training system 110 need not use the same hardware to compute the operations of each layer. In other words, the training system 110 can use CPUs only, highly parallelized hardware, or some combination of these.

The training neural network subsystem 114 can compute the operations of each layer of the neural network using current parameter values 115 stored in a collection of model parameter values 170. Although illustrated as being logically separated, the model parameter values 170 and the software or hardware modules performing the operations may actually be located on the same computing device or on the same memory device.

The training neural network subsystem 114 can receive training examples 123 as input. The training examples 123 can include labeled training data 125. Each of the training examples 123 includes input image data as well as one or more labels that indicate the location of static portions in the input image data.

The training neural network subsystem 114 can generate, for each training example 123, one or more static location predictions 135. Each static location prediction 135 can include a score that represents a likelihood that a static portion of the environment is visible at the location in the input image. A training engine 116 analyzes the static location predictions 135 and compares the static location predictions to the labels in the training examples 123. The training engine 116 then generates updated model parameter values 145 by using an appropriate updating technique, e.g., stochastic gradient descent with backpropagation, based on differences between the static location predictions and the labels. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. The training system 110 can provide the final set of model parameter values 171 by a wired or wireless connection to the on-board system 120.

Figure 2:
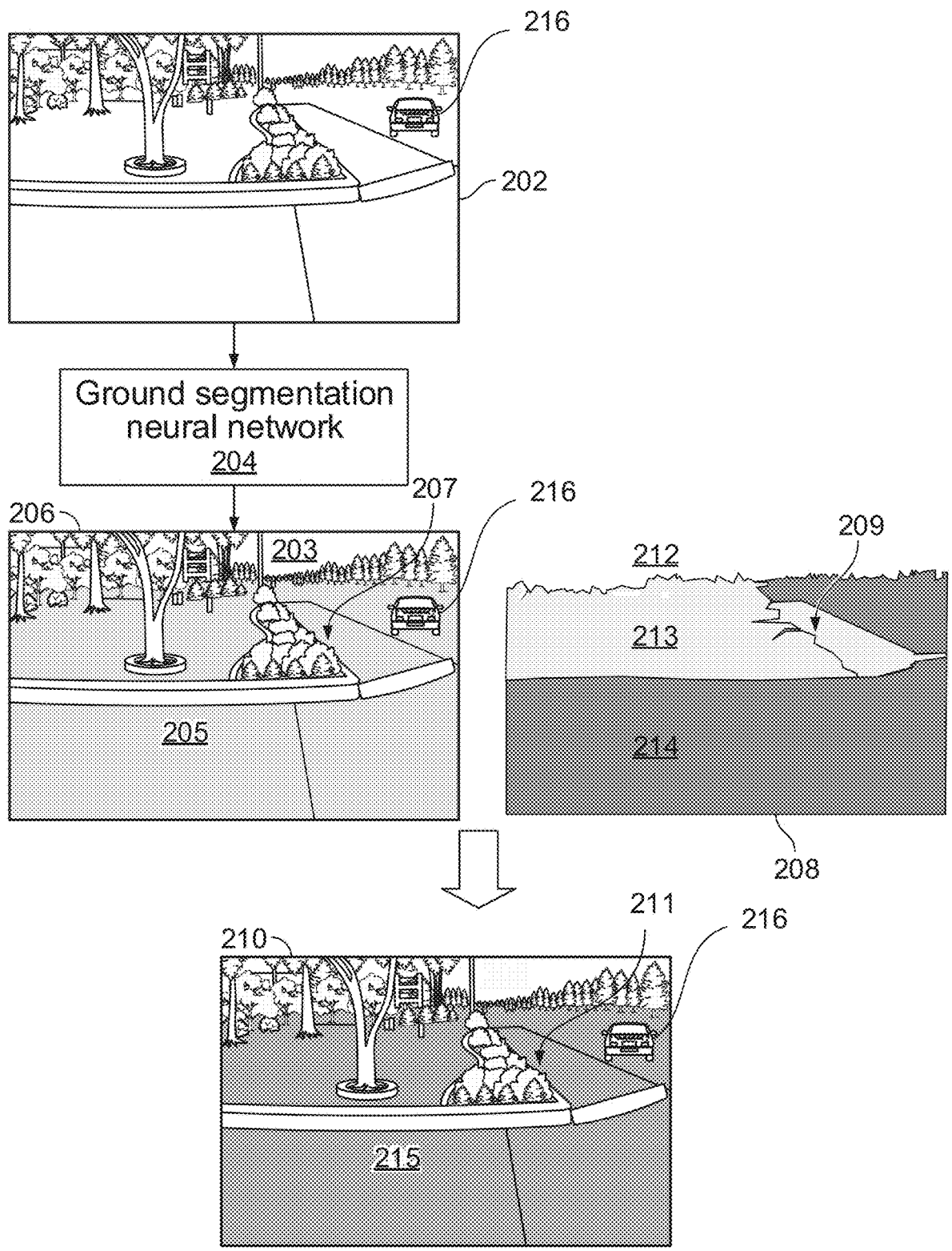
FIG. 2 illustrates an example of generating depth output from an image and known depth data.

FIG. 2 illustrates an example of generating a depth output 210 from an image 202 and known depth data 208.

The image 202 is a camera image taken from a side view camera in the sensor subsystem 132. The camera image 202 captures a scene of the environment with trees, cars, roads, paved sidewalks, and grass areas, etc. A static portion of the scene can include the roads, paved sidewalks and grass area, i.e., because those portions are always present at that location in the environment. A non-static portion of the scene can include the cars, i.e., because the location of the cars in the real-world changes and the cars are therefore not always present at that location in the environment.

The camera image 202 can capture a portion of a road that is relatively far from the location of the camera and is farther than can be sensed by lidar or radar sensors. Therefore, it is beneficial to generate a depth map from the camera image to allow depth values to be available for locations that cannot be sensed by lidar or radar.

The system provides the camera image 202 as input to a neural network trained to identify locations in the camera image that are static portions of an environment. The neural network can be trained to generate a respective score for each of a plurality of locations in the camera image. The respective score for each location can represent a likelihood that a static portion of the environment is visible at the location in the camera image.

For example, the neural network can be a ground segmentation neural network 204 trained to generate a respective score for each pixel in the camera image. The respective score for each pixel can represent a likelihood that the pixel depicts a ground surface, e.g., roads, paved sidewalks and grass areas, and so on.

The ground segmentation neural network 204 can have an architecture of an image segmentation neural network configured to generate a respective score for each pixel in the image. For example, the ground segmentation neural network 204 can be a DeepLabv3+ model. More details about such a model are described in Chen, Liang-Chieh, et al. "Encoder-decoder with atrous separable convolution for semantic image segmentation." Proceedings of the European conference on computer vision (ECCV). 2018.

For each location in the camera image, the system can determine whether a non-static portion of the camera image or a static portion of the camera image is depicted at the location based on whether the generated score for the location exceeds a threshold score.

For example, a pixel 207 in the camera image corresponds to a portion of the sidewalk. The neural network can generate a probability score of 0.99 representing that the pixel 207 is very likely to be ground surface. The system can determine that the pixel 207 depicts a ground surface based on determining that the generated probability score 0.99 exceeds a threshold, e.g., 0.9, 0.8, or 0.75. For example, some pixels in the camera image corresponding to a car 216 on the road. The neural network can generate low confidence scores representing that these pixels corresponding to the car are very unlikely to be ground surface.

In image 206, a binary mask overlays on top of the original camera image, representing a ground portion of the mask 205 (solid gray color) and a non-ground portion of the mask 203 (white color). Here, the ground portion of the mask 205 can include walkable surfaces such as the grassy areas and road areas. The ground portion of the mask 205 does not include the region of the car 216.

Known depth data specifying a known depth value for some locations in the image can be available. The known depth value for each location is a distance from the camera to a static portion of the environment when the static portion is visible at the location in the camera image. The known depth data can be in different formats, e.g., a ground surface elevation map or height map that is built from LIDAR data from the cars. Alternatively or in combination, the known depth data can be a three-dimensional range map.

A range map 208 from the same perspective as the camera image 202 can be provided to the system. The range map 208 can be constructed by projecting pre-defined known range data to the camera coordinates, i.e., the real-world location and perspective of the camera that captured the image. The range map 208 can provide depth information for the ground surfaces of the environment. The range map can include depth values for the road areas 214 and depth values for the ground surface areas that are not road areas 213, e.g., paved sidewalks and grass areas. The depth values for the non-static portion 212 of the image may not be available in the range map.

In some implementations, when constructing the range map 208 from a pre-defined known range data, there can be errors in the position or rotation of the camera in the car, which can create errors in the range map 208. In the worst case, at the horizon of the scene, a very small change in the pitch of the camera can make a huge difference in the measured depth. By looking at a local region in the known depth data, the system can calculate a bound on the angular pose error and then determine a lower bound on the range estimate. For example, if the estimate for the rotation of the camera has errors within a few tenths of a degree, the system can calculate a minimum range value within a neighborhood of pixels around a point of interest, which is a lower bound on the possible range, and use that minimum range value as the value for those pixels in the range map 208. Alternatively or in combination, the system can also align the camera image to the previously generated known depth map by using correspondences to sparse image features or dense alignment features.

In some implementations, when constructing the range map 208 from pre-defined known range data, the constructing process can also account for rolling-shutter effects of the camera. For example, when the car is moving, different scanlines of the image are taken at different poses, which may distort the image. The constructing process can simulate this distortion such that the system can assign the correct depth values for the pixels in the image. When the system query from a 3D point to determine the correct pixel in the image, the system also applies the same correction process.

Based on the known depth data specifying respective known depth values for some static locations in the camera image, the system can generate a depth output for at least some of the locations in the camera image. For each location in the camera image, if the neural network generates a confidence score that exceeds a threshold, and if a known depth value for the location is available in the known depth data, the system can assign the known depth value for the location to the location in the depth output.

For example, based on the known range map 208 specifying known depth values for some static locations 213 and 214 in the camera image, the system can generate a depth output 210 for the static portion 205 in the camera image. The depth output 210 includes depth values 215 (dark gray color) for static locations in the scene. For example, as discussed in a previous example, the pixel 207 in the camera image can have a confidence score of 0.99 that exceeds a threshold of 0.9 and can be determined as ground surface. A known depth value 209 for the corresponding pixel 207 can be available in the known range map 208. The system can assign the known depth value 209 for the pixel 207 to the corresponding pixel 211 in the depth output 210. As another example, the depth output 210 does not include depth values for the pixels of the car 216 because the confidence scores for the pixels of the car are too low.

By filtering the ground-based range map to the areas actually observed as ground surface in the camera image, the system can generate a depth map for some part of the camera image. The depth map generated from camera image may provide accurate depth values for landmarks or surfaces that are hundreds of meters away from the current location of the camera sensor.

In some implementations, in addition to assigning the known depth value for the location to the location in the depth output, the system can also associate the depth value with the confidence score for the location. This can provide more information about the likelihood that an occlusion exists at any given location in addition to specifying a depth value for the location if no occlusion exists.

In yet other implementations, instead of applying a threshold, for every location for which a known depth value is available in the known depth data, the system can assign the known depth value for the location to the location in the depth output and associate the known depth value with the confidence score. Like the above, this can provide more information about the likelihood that an occlusion exists at any given location in addition to specifying a depth value for the location if no occlusion exists, even if the likelihood of occlusion is very high.

Figure 3:
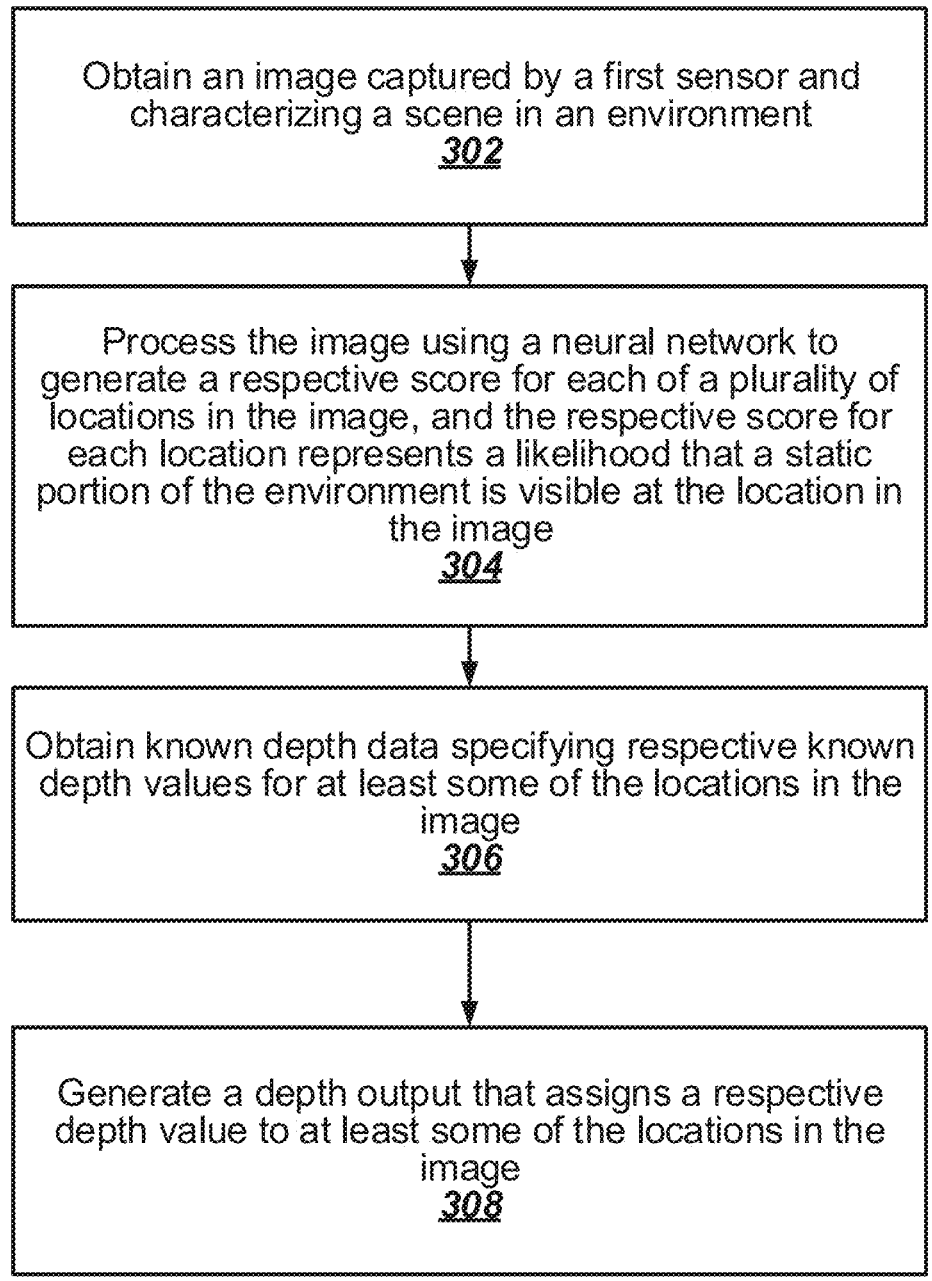
FIG. 3 is a flowchart of an example process for generating depth output from an image using neural network.

FIG. 3 is a flowchart of an example process for generating depth output from an image using neural network. The example process in FIG. 3 uses a forward inference pass through a neural network that has already been trained or is being trained to identify locations in an image that are static portion of an environment. The example process can thus be used during training or to make predictions from unlabeled input, e.g., in a production system. The process will be described as being performed by an appropriately programmed neural network system.

The system obtains an image captured by a first sensor and characterizing a scene in an environment (302). The image can be a camera image generated from the camera subsystem in a sensor subsystem of a vehicle.

The system processes the image using a neural network to generate a respective score for each of a plurality of locations in the image (304). The score for each of the locations represents the likelihood that a static portion of the environment is visible at the location in the image.

The neural network can be a ground segmentation neural network that can generate a respective score for each pixel in the camera image. The respective score for each pixel can represent a likelihood that the pixel depicts ground surface, e.g., the roads, paved sidewalks and grass areas, etc. For each location in the camera image, based on whether the generated score of the location exceeds a threshold, the system can determine a static portion of the camera image.

After generating a respective score for each of a plurality of locations in the image, the system can take different actions depending on whether the forward inference pass is being used for training or in a production system.

During training, the respective score for each of a plurality of locations in the image can be used to compute one or more errors based on the labels in the training example used. The errors can be used to compute updated weights for the neural network, using any appropriate training technique, e.g., gradient descent with backpropagation.

When used in an on-board production system, the respective score for each of a plurality of locations in the image can be provided to step 308 to generate a depth output that assigns a respective depth value to at least some of the locations in the image.

The system obtains known depth data specifying respective known depth values for at least some of the locations in the image (306). In some implementations, the system can generate the known depth data by assigning a respective known depth value to each of plurality of pixels in a second image that is from the same perspective as the image captured by the first sensor. The second image can be a range map from the same perspective as the camera image. The range map can provide depth information for the ground surface of the environment. Because the ground surfaces of the environment are static, the depth information for these portions of the environment from any given vantage point is also static.

The system generates a depth output that assigns a respective depth value to at least some of the locations in the image (308). For each location in the image, the system can determine whether the score for the location exceeds a threshold. When the score for the location exceeds the threshold and the known depth data specifies a known depth value for the location, the system assigns the known depth value for the location to the location in the depth output. In some implementations, the system can further associate the known depth value with the score for the location in the depth output.

In some implementations, the system can also identify that there are occlusions at particular locations in the image, i.e., that the view of the camera is occluded by one or more potentially moving objects, based at least in part on the known depth data and the confidence scores. For example, when the known depth data specifies a known depth value for a given location in the image, the system can determine that there is an occlusion at the location if the score for the road is below a predetermined threshold. For example, if a known depth data is available for a portion of a road and a score for the portion of the road is below the predetermined threshold because the portion of the road is currently occupied by a vehicle, the system can determine that there is an occlusion at the portion of the road.

The generated depth output can be provided to a planning subsystem that makes decisions about how the vehicle should react to the predicted depth output. For example, these interaction predictions can be exploited at many stages of a self-driving car pipeline, e.g., segmentation, tracking, action recognition and behavior prediction. For example, the vehicle can autonomously apply the brakes if a predicted depth map indicates that a human driver is about to navigate onto static obstacles.

When there are multiple camera images obtained from multiple cameras that capture the surrounding environment, the system may generate depth output from some of the camera images to save computation cost. In some implementations, the system only needs long range perception in front of the vehicle, e.g., when the vehicle is driving on a highway, and therefore the system only needs to generate depth output from front camera images. In some implementations, camera images that capture lanes of traffic which might intersect with an unprotected maneuver are processed and depth outputs are only generated from these images. In some implementations, the system can switch between processing images from different cameras, e.g., between a left camera and a right camera, at different time intervals.

In some implementations, the process for generating depth output from an image using neural network can further include generating depth output for a non-static object in the image. The system can obtain location information identifying a region of the image that depicts a non-static object in the image. For example, the system can detect a car in the camera image and identify a region of the car using a bounding box surrounding the car.

The system can determine whether any static locations having a score that exceeds a threshold are next to or intersect with a predetermined part of a region in the image that depicts a non-static object. For example, the system can determine that a portion of the road areas intersects with a predetermined part of the bounding box surrounding the car. The predetermined part of the bounding box surrounding the car can be the bottom part of the car that are next to the ground.

When one of the static locations is next to or intersects with the region that depicts a non-static object in the image, the system can assign the depth value in the depth output for the static location corresponding to the region of a non-static object using the generated depth value for the static location. For example, based on the depth value of the road areas generated from camera images, the system can assign, to a car in the environment, the depth value for a portion of the road that intersects with the bottom part of the car. Even through the car is outside the range measurable from lasers and radars, the depth value of the car can still be estimated based on the camera image.

The assigned depth value for the non-static object can be equal to the depth value of the corresponding static location. Alternatively, the assigned depth value for the non-static object can be calculated based on the relative position between the non-static object and the corresponding static location in the image.

Figure 4:
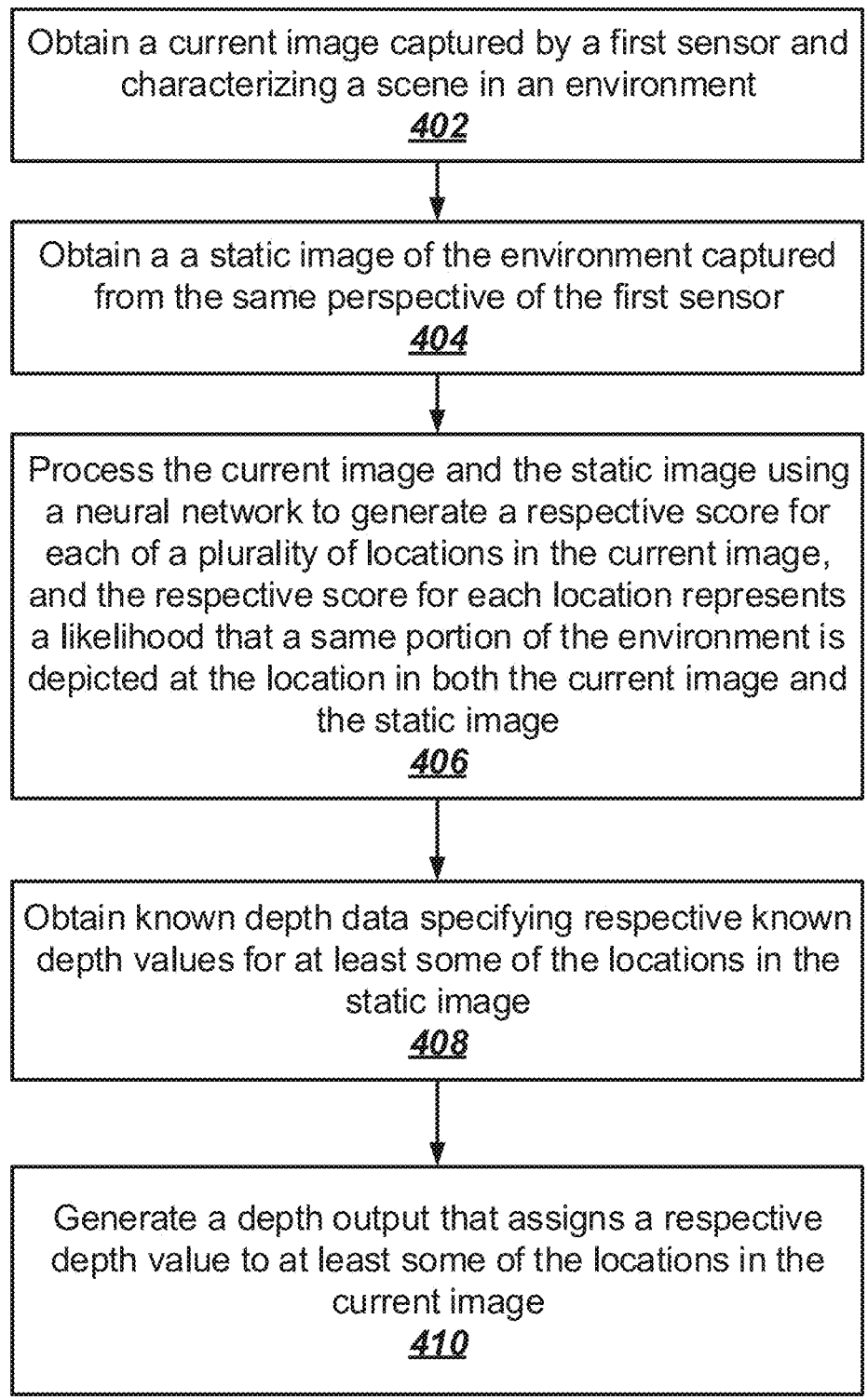
FIG. 4 is a flowchart of an example process for generating depth output from a current image and a static image using neural network.

FIG. 4 is a flowchart of an example process for generating depth output from a current image and a static image using neural network. The example process in FIG. 4 uses a forward inference pass through a neural network that has already been trained or is being trained to identify locations in the current image that are the same portion of the environment as depicted in the static image. The example process can thus be used during training or to make predictions from unlabeled input, e.g., in a production system. The process will be described as being performed by an appropriately programmed neural network system.

The system obtains a current image captured by a first sensor and characterizing a scene in an environment (402). The image can be a camera image generated from the camera subsystem in a sensor subsystem of a vehicle.

The system obtains a static image of the environment captured from the same perspective of the first sensor (404). For example, the static image can be a street view image rendered from the same perspective of the camera that captures the current image, i.e., an image from the perspective of a vehicle on a road. The street view image can characterize an empty world with only buildings and ground, and without pedestrians, cars or anything non-static. In some implementations, objects, e.g., parked cars, can be included in the street view image in order to provide a lower bound for the depth value of the ground because the actual depth value of the ground is greater than or equal to the depth value of the object.

In some implementations, the static image can include a three-dimensional (3D) surface of the environment. For example, one or more 3D surfel maps, can include a surface of a building in the environment. The one or more 3D surfel maps can provide a better 3D rendering of the surrounding environment.

The system processes the current image and the static image using a neural network to generate a respective score for each of a plurality of locations in the current image (406). The score for each of the locations represents the likelihood that the same portion of the environment is depicted at the location in both the current image and the static image. For example, the system can use a trained neural network to determine which regions of the image captured by the first sensor match the regions in the one or more 3D surfel maps and determine which regions of the image depict new objects in the scene.

After generating a respective score for each of a plurality of locations in the current image, the system can take different actions depending on whether the forward inference pass is being used for training or in a production system.

During training, the respective score for each of the plurality of locations in the current image can be used to compute one or more errors based on the labels in the training example used. The errors can be used to compute updated weights for the neural network, using any appropriate training technique, e.g., gradient descent with back-propagation.

When used in an on-board production system, the respective score for each of a plurality of locations in the current image can be provided to step 410 to generate a depth output that assigns a respective depth value to at least some of the locations in the current image.

The system obtains known depth data specifying respective known depth values for at least some of the locations in the static image (408). In some implementations, if the static image is already associated with known depth data, the system can directly obtain known depth data specifying respective known depth values for at least some of the locations in the static image. In some other implementations, if the static image is not associated with known depth data, the system can generate the known depth data by assigning a respective known depth value to each of a plurality of pixels in a third image that is from a same perspective as the current image captured by the first sensor.

The system generates a depth output that assigns a respective depth value to at least some of the locations in the current image (410). For each location in the current image, the system can determine whether the score for the location exceeds a threshold, i.e., whether the location in both the current image and the static image depicts the same static portion of the environment. When the score for the location in the current image exceeds the threshold and the known depth data specifies a known depth value for the same location in the static image, the system assigns the known depth value to the location in the depth output.

For example, when the static image includes 3D surfel maps of the environment, the system can assign known depth value for some of the regions in the 3D surfel maps to the corresponding regions in the depth output that match the regions in the 3D surfel maps. For example, when the 3D surfel map includes 3D surface of a building in the environment, the system can assign the known depth value for the surface of the building to the same location in the depth output that matches the location of the surface of the building.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising: obtaining an image captured by a first sensor and characterizing a scene in an environment;
   processing the image using a neural network to generate a respective score for each of a plurality of pixels in the image, wherein the respective score for each pixel represents a likelihood that a static portion of the environment is visible at the pixel in the image;
   obtaining known depth data specifying respective known depth values for at least some of the pixels in the image, wherein the respective known depth value for each pixel is a distance from the first sensor to the static portion of the environment when the static portion is visible at the pixel in the image; and
   generating a depth output that assigns a respective depth value to at least some of the pixels in the image, comprising, for each pixel in the image:
      determining whether the score for the pixel exceeds a threshold; and
      when the score for the pixel exceeds the threshold and the known depth data specifies a known depth value for the pixel, assigning the known depth value for the pixel to the pixel in the depth output.

2. The method of claim 1, wherein the static portion is a ground surface of the environment.

3. The method of claim 1, further comprising:
   obtaining pixel information identifying a region of the image that depicts a non-static object in the image; and
   wherein generating the depth output further comprises:
      determining whether any pixels having a score that exceeds a threshold are next to or intersect with the region in the image; and
      when one of the pixels is next to or intersects with the region, assigning the depth value in the depth output for the pixels corresponding to the region using the generated depth value for the pixel.

4. The method of claim 3, wherein the static portion is a ground surface of the environment, and wherein the non-static object is a car in the image.

5. The method of claim 1, wherein the neural network is an image segmentation neural network configured to generate a respective score for each pixel in the image.

6. The method of claim 1, wherein the known depth data assigns a respective known depth value to each of a plurality of pixels in a second image that is from a same perspective as the image captured by the first sensor.

7. The method of claim 1, wherein generating the depth output further comprises:
   associating the known depth value with the score for the pixel in the depth output.

8. The method of claim 1, further comprising:
   determining that there is an occlusion at a first pixel for which the known depth data specifies a known depth value based at least in part on the respective score for the first pixel.

9. The method of claim 1, further comprising: controlling a vehicle using the depth output.

10. The method of claim 1, further comprising: displaying a depth map generated from the depth output.

11. A method comprising:
   obtaining a current image captured by a first sensor and characterizing a scene in an environment;
   obtaining a static image of the environment captured from a same perspective of the first sensor;

processing the current image and the static image using a neural network to generate a respective score for each of a plurality of pixels in the current image, wherein the respective score for each pixel represents a likelihood that a same portion of the environment is depicted at the pixel in both the current image and the static image;

obtaining known depth data specifying respective known depth values for at least some of the pixels in the static image, wherein each known depth value is a distance from the first sensor to the portion of the scene that is depicted at the pixel in the static image;

generating a depth output that assigns a respective depth value to at least some of the pixels in the current image, comprising, for each pixel in the current image:
  determining whether the score for the pixel exceeds a threshold; and
  when the score for the pixel exceeds the threshold and the known depth data specifies a known depth value for the locationpixel, assigning the known depth value for the pixel to the pixel in the depth output.

12. The method of claim 11, wherein the plurality of pixels in the static image comprise three-dimensional surface of the environment.

13. The method of claim 12, wherein the three-dimensional surface of the environment comprise a surface of a building in the environment.

14. The method of claim 11, wherein the neural network is an image segmentation neural network configured to generate a respective score for each pixel in the current image.

15. The method of claim 11, wherein the known depth data assigns a respective known depth value to each of a plurality of pixels in a third image that is from a same perspective as the current image captured by the first sensor.

16. The method of claim 11, wherein generating the depth output further comprises:
  associating the known depth value with the score for the pixel in the depth output.

17. The method of claim 11, further comprising:
  determining that there is an occlusion at a first pixel for which the known depth data specifies a known depth value based at least in part on the respective score for the first pixel.

18. The method of claim 11, further comprising: controlling a vehicle using the depth output.

19. The method of claim 11, further comprising: displaying a depth map generated from the depth output.

20. A system comprising:
one or more computers and one or more storage devices storing instructions that are operable, when executed by the one or more computers, to cause the one or more computers to perform operations comprising:
  obtaining an image captured by a first sensor and characterizing a scene in an environment;
  processing the image using a neural network to generate a respective score for each of a plurality of pixels in the image, wherein the respective score for each pixel represents a likelihood that a static portion of the environment is visible at the pixel in the image;
  obtaining known depth data specifying respective known depth values for at least some of the pixels in the image, wherein the respective known depth value for each pixel is a distance from the first sensor to the static portion of the environment when the static portion is visible at the pixel in the image; and
  generating a depth output that assigns a respective depth value to at least some of the pixels in the image, comprising, for each pixel in the image:
    determining whether the score for the location pixels exceeds a threshold; and
    when the score for the pixel exceeds the threshold and the known depth data specifies a known depth value for the pixel, assigning the known depth value for the pixel to the pixel in the depth output.

21. The system of claim 20, wherein the operations further comprise:
obtaining pixel information identifying a region of the image that depicts a non- static object in the image; and
wherein generating the depth output further comprises:
  determining whether any pixels having a score that exceeds a threshold are next to or intersect with the region in the image; and
  when one of the pixels is next to or intersects with the region, assigning the depth value in the depth output for the pixels corresponding to the region using the generated depth value for the pixels.

22. The system of claim 21, wherein the static portion is a ground surface of the environment, and wherein the non-static object is a car in the image.

23. The system of claim 20, wherein the neural network is an image segmentation neural network configured to generate a respective score for each pixel in the image.

24. The system of claim 20, wherein the known depth data assigns a respective known depth value to each of a plurality of pixels in a second image that is from a same perspective as the image captured by the first sensor.

* * * * *